United States Patent Office 2,909,256
Patented Oct. 20, 1959

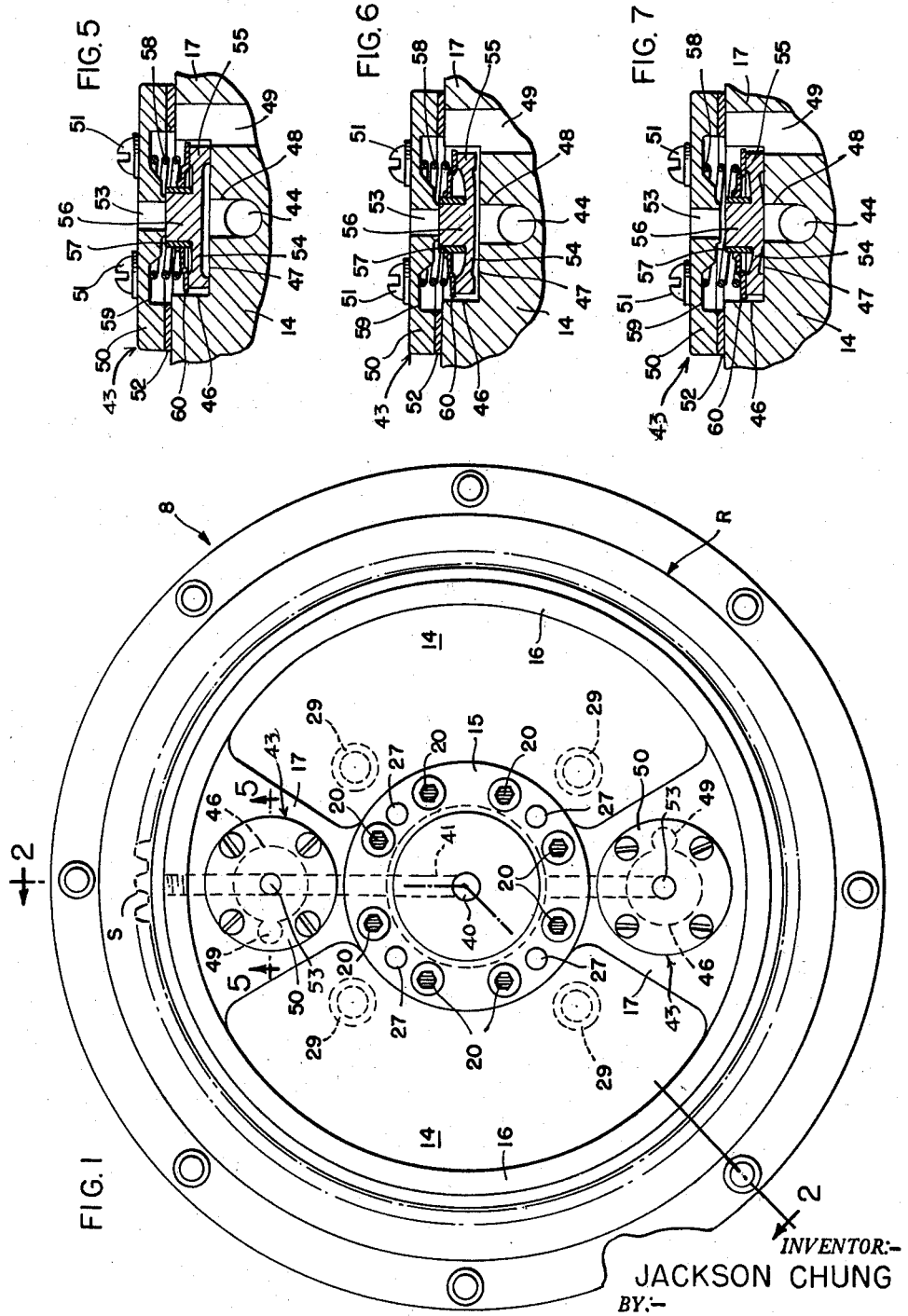
Oct. 20, 1959  JACKSON CHUNG  2,909,256
FLUID PRESSURE ACTUATED MECHANISM
Filed Aug. 19, 1955  2 Sheets-Sheet 1
INVENTOR:—
JACKSON CHUNG
BY:—
Marzall, Johnston, Cook & Root
ATTORNEYS

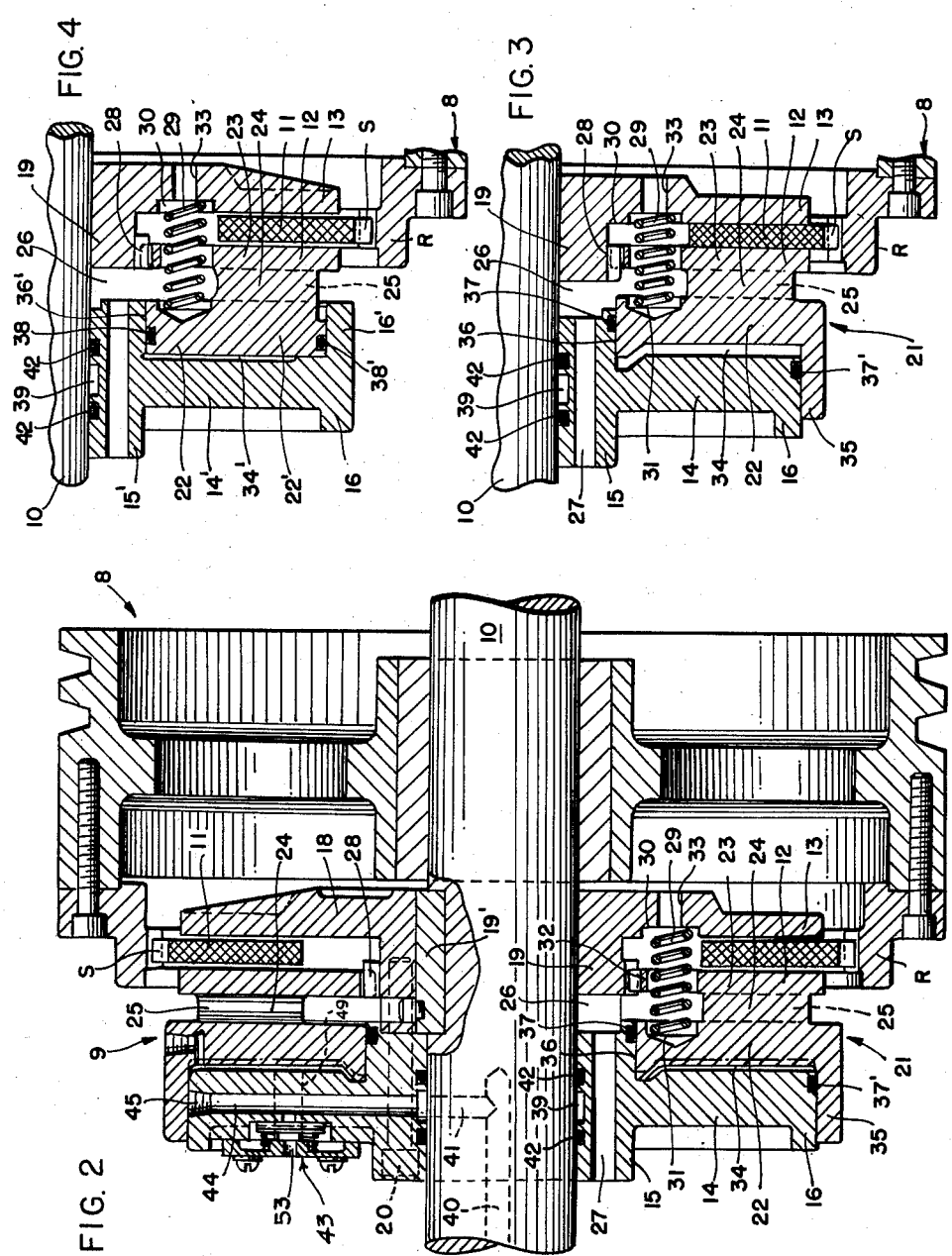

2,909,256

FLUID PRESSURE ACTUATED MECHANISM

Jackson Chung, Mishawaka, Ind., assignor to Dodge Manufacturing Corporation, Mishawaka, Ind., a corporation of Indiana Application August 19, 1955, Serial No. 529,528

5 Claims. (Cl. 192—85)

The present invention relates in general to dynamic mechanism, such as clutches and brakes, of the sort adapted for use in connection with a mechanical power transmitting shaft, the invention having more particular reference to a power transmitting clutch structure.

An important object of the present invention is to provide an improved fluid pressure operated clutch structure; a further object being to provide an improved cushioning effect in a torque transmitting device of the character mentioned.

Another important object is to provide a fluid pressure actuated torque transmitting clutch structure, including improved means for controlling the same in response to movement of a relatively small amount of fluid pressure clutch actuating medium; a further object being to provide quick action valve means for controlling the movement of the fluid clutch actuating medium to thus provide for optimum sensitivity in the control of clutch engagement and disengagement.

Another important object is to provide a clutch structure of the character mentioned embodying a minimum number of parts of relatively simple configuration, to thereby provide simplicity and economy of construction and to facilitate assembly of the device as well as the replacement of parts thereof.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 1 shows a clutch structure embodying the present invention as viewed axially from an end thereof;

Fig. 2 is a sectional view taken substantially along the line 2—2 in Fig. 1, showing the structure in released or clutch disengaged condition;

Fig. 3 is a sectional view of a portion of the structure shown in Fig. 2, illustrating the parts in clutch engaged condition;

Fig. 4 is a sectional view similar to Fig. 3 and showing a modified construction, the parts being illustrated in clutch disengaged condition; and Figs. 5, 6 and 7 are sectional views taken substantially along the line 5—5 in Fig. 1 to illustrate valve means for controlling the flow of clutch actuating fluid, the several figures showing corresponding relatively shifted positions of the component parts of the valve means.

To illustrate the invention the drawings show a pulley or flywheel 8 and a clutch structure 9 selectively operable to drivingly connect the wheel 8 with a shaft 10, with respect to the axis of which the wheel is turnably supported.

The clutch structure 9 may comprise a clutch plate 11 of ring-like configuration drivingly connected with the wheel 8, cooperating clutch plates 12 and 13 drivingly connected with the shaft 10, and means to press the plates 12 and 13 mutually together and into frictional clutching engagement with the plate 11, to thereby engage the clutch, the plates 12 and 13 being mutually separable to release the clutch.

To these ends, the clutch structure may comprise a ring-like mounting R adapted to support the clutch plate 11 on the flywheel 8, means such as bolts being provided for fastening the mounting ring, as to the rim of the wheel 8. In order to prevent relative rotation of the clutch plate 11 within and with respect to the mounting ring R, the peripheral edge of the plate and the inwardly facing surface of the ring may be formed with interfitting spline means S, the same preferably comprising integral interfitting teeth formed on the clutch plate and mounting ring, whereby the plate is supported against relative turning movement with respect to the ring, movement of the plate being freely permitted with respect to the ring, axially of the shaft 10.

The clutch structure 9 may also comprise a wheel-like frame 14 embodying a central hub 15, sized to snugly fit the shaft 10, and a preferably circular rim 16, said frame being formed with a plurality of valve carrying embossments 17 extending radially between the hub and the rim. Means is provided for securing the frame 14 to the shaft 10, said means in the illustrated embodiment comprising an annular plate member 18 forming the clutch plate 13, the member 18 having a central hub 19 sized to snugly fit the shaft 10, a spline or feather 19′, or other suitable fastening means, being employed to fasten the plate member 18 on the shaft. The hub 19 at one end may be formed to abut against the facing end of the hub 15, fastening studs 20 being employed to secure the hubs 15 and 19 firmly together in end abutting relationship.

The clutch structure may also comprise an annular member 21 cooperatively associated with the frame 14 and disposed between said frame and the plate member 18, means being provided for moving the member 21 with respect to the frame 14 in a direction axially of the shaft 10 toward and away from the plate member 18, in order to engage and disengage the clutch structure, by frictionally engaging and disengaging the clutch plate 11 between the members 18 and 21. The member 21 may comprise a pair of annular plate portions 22 and 23 rigidly secured together in spaced relationship in any suitable or convenient fashion, portion 23 forming the clutch plate 12 and being supported in position facing the plate 11. As shown, the plate portions 22 and 23 preferably are integrally united, as by circularly spaced bosses 24 disposed between the plate portions, said spaced bosses defining radial air ducts 25 between the plate portions 22 and 23, said radial ducts communicating central chambers 26 formed at circularly spaced intervals between the abutting ends of the hubs 15 and 19 with the periphery of the member 21. The chambers 26 may also be connected with longitudinally extending air channels 27 formed axially in the hub 15. As a consequence, rotation of the clutch structure with the shaft 10 will cause a cooling draft of air to be drawn axially through the ducts 27 into the chambers 26, and expelled thence radially through the ducts 25 between the plate portions 22 and 23 of the member 21, thereby cooling said member.

In order to prevent relative rotation of the annular member 21 with respect to the frame 14 and the shaft mounted plate member 18, the inner edge of the plate portion 23 and the hub 19 which extends therein may be formed with interfitting spline means 28, the same preferably comprising integral interfitting teeth formed on the hub 19, adjacent the plate portion 18, and on the inner edge of the plate portion 23. The annular member 21 is thus anchored against relative turning movement with respect to the frame 14 and the plate member 18 while being free to move therebetween axially of the shaft 10, to thereby frictionally engage and release the clutch plate 11 between the plate portions 12 and 13.

Suitable means, such as the circularly spaced, preferably helical compression springs 29, may be provided for normally urging the member 21 in a direction axially of the shaft 10 and away from the plate member 18, to thereby release the clutch plates 12 and 13 from engagement with the plate 11. As shown, the springs 29 may be each seated at one end in pockets 30 formed in the plate member 18 immediately outwardly of the hub 19 and inwardly of the inner edge of the plate 11. Each spring, at its opposite end, may engage a seat 31 formed in the plate portion 22 of the member 21, the springs 29 extending freely each in an opening 32 formed in the plate portion 23 of the member 21. The plate member 18 may be formed with openings 33 therethrough, each of said openings communicating with a corresponding one of the spring seats 30 and thence through one of the openings 32 with a corresponding one of the ducts 25, whereby cooling air may be delivered to the ducts not only through the channels 27 but also through the openings 33.

The frame 14 and member 21 are formed to provide an expansible chamber 34 of ring-like configuration therebetween so that, by applying a suitable fluid pressure medium such as air in such expansible chamber, the member 21 may be moved with respect to the frame 14 in a direction axially of the shaft 10 to press the plate 12 toward the plate 13, and thereby squeeze the plate 11 frictionally therebetween. To this end, as shown more particularly in Figs. 2 and 3, the plate portion 22 of the member 21 may be formed with a peripheral rim 35 sized to snugly yet slidingly embrace the rim 16 of the frame 14. The inner circular edge of the plate portion 22 may be formed to snugly yet slidingly embrace an outwardly facing seat 36 formed on the hub portion 15 of the frame 14. The hub 15 and rim 16 of the frame 14, if desired, may be formed with circumferential grooves, respectively containing rings of packing material 37 and 37', in order to seal the inner and outer sides of the expansible chamber 34.

As shown more particularly in Fig. 4 of the drawings, the plate portion 22 of the member 21 may be constituted as a piston 22' of ring-like configuration having an inwardly facing side sized to snugly yet slidingly engage an outwardly facing seat 36' formed on the hub portion 15' of the frame 14', the outwardly facing side of said ring-like piston being sized to snugly yet slidingly fit within a peripheral wall portion 16' formed at the rim of the frame 14'. The frame 14' thus constitutes a cylinder of ring-like configuration for cooperation with the piston 22' in order to form the expansible chamber 34' therebetween. If desired, the inner and outer sides of the piston 22' may be formed with grooves for respectively receiving packing rings 38 and 38'.

Fluid pressure means is provided for moving the annular member 21 against the influence of the springs 29 toward clutch engaging position. To this end, the hub 15 may be provided with an internal annular groove 39, and the shaft 10 may be provided with an axial bore 40 communicating with the groove 39 through a radial duct 41 formed in the shaft. If desired, the hub 15 may also be provided with grooves spaced outwardly and on opposite sides of the groove 39 for the purpose of carrying sealing rings 42 of suitable packing material. A suitable fluid pressure medium, such as air, thus may be delivered from a suitable source through the bore 40 and duct 41 into the groove 39, and may be applied thence into the expansible chamber 34 through valve means 43 mounted as on the embossments 17 of the wheel-like frame 14. As shown, channels 44 may be formed in the frame 14 in position extending centrally through the embossments 17 in directions radially between the groove 39 and the periphery of the frame, the outer ends of the channels 44 being preferably closed, as by means of closure plugs 45.

As shown more particularly in Figs. 5, 6 and 7, the valve means 43 may comprise components assembled in valve seats formed in the embossments 17, said seats preferably comprising each an open top cavity 46 formed in the embossment in order to constitute the bottom of the cavity as a valve seating surface 47, each cavity being connected with a corresponding channel 44 through a connection duct 48 connecting the channel 44 with the cavity, preferably centrally of the seating surface 47. Marginally thereof, the cavity 46 is connected with the expansible chamber 34 by means of a channel 49 formed through the frame 14. The open top of the cavity is preferably closed by a removable cover plate 50, which may be mounted on and secured to the embossment by suitable fastening means, such as the screws 51, a sealing gasket 52 being preferably applied between the rim of the cover plate 50 and the underlying portions of the embossment 17 around the cavity 46. The cover plate 50 is provided with a vent opening 53, which is preferably formed centrally of the cover plate in coaxial alinement with the connection duct 48.

The valve preferably comprises a disc 54 of resilient flexible material, such as neoprene or other rubbery gasket material, said disc having a rim 55 adapted to sealingly engage with the seating surface 47 around the connection duct 48, a relatively flexible diaphragm portion within the rim 55, and a central boss 56 in position disposed between the seating surface 47 and the inner surface of the cover plate 50 at the vent opening 53, said boss 56 having a maximum dimension somewhat less than the vertical distance between the seating surface 47 and the inwardly facing surface of the cover plate 50. Accordingly, the boss portion of the gasket may sealingly engage either the seating surface 47 to thereby close the duct 48, or the inwardly facing surface of the cover plate 50 to thereby seal the vent opening 53, but may not simultaneously seal both duct and vent opening. If desired, a retaining sleeve 57 of relatively rigid material may be assembled snugly around and in frictional engagement with the boss 56.

The valve structure may also include a preferably helical compression spring 58 bearing at its opposite ends upon the rim 55 of the valve disc and upon the cover plate 50 around the vent opening 53, said cover plate being preferably formed with an annular groove 59 providing a seat for the spring 58 and defining an embossment through which the vent duct 53 is formed. If desired, a disc 60 of suitable long wearing material, such as metal, may be applied between the spring 58 and the rim 55 of the valve disc.

As shown more especially in Fig. 5 of the drawings, the compression spring 58 normally serves to hold the rim 55 of the valve disc in sealing engagement with the seat forming surface 47, thereby isolating the fluid delivery system, comprising the bore 40, duct 41, groove 39, and channels 44, from the expansible chamber 34. The valve disc also normally serves to seal the vent opening 53, thereby isolating the expansible chamber from atmosphere. Upon delivery of a fluid actuating medium, such as air under pressure in the delivery system, comprising the bore 40, duct 41, groove 39, and channels 44, the valve disc may be flexed against the influence of the spring 58 to retract its rim 55 from the seating surface 47, as shown in Fig. 6, and thereby permit the fluid pressure medium to be delivered through the duct 48, the cavity 46, and the channel 49 into the expansible chamber 34, to thereby move the member 21 in a direction to squeeze the plates 12 and 13 together upon the plate 11 and thus cause clutch engagement. As soon as brake applying pressure in the expansible chamber and channel 49 becomes equal to the pressure of the fluid actuating medium in the channels 44, the spring 58 will return the valve disc to the relative position shown in Fig. 5.

In order to release the clutch mechanism from its engaged position, it is merely necessary to reduce the pressure of the actuating medium as applied in the channels 44 below that which prevails in the expansible chamber 34 during the clutch applying interval, such reduction in fluid pressure permitting the central or boss portions 56 of the valve disc to seat upon the surface 47, as shown more particularly in Fig. 7 of the drawings, thereby uncovering the vent opening 53 and connecting the same with the channel 49. Accordingly, the fluid pressure medium at clutch engaging pressure in the expansible chamber 34 may thus be released or vented directly to atmosphere through the channel 49, the cavity 46, and the vent opening 53. As the fluid pressure medium is thus vented to atmosphere from the chamber 34, the springs 29 will act to shift the member 21 away from the plate-like member 18 and thus release the plates 12 and 13 from engagement with the plate 11.

It will be understood, of course, that the clutch means 9 may be employed to drivingly connect the wheel structure with the shaft to drive the same, or to form a torque transmitting coupling for the purpose of driving the wheel from the shaft. It should be equally obvious that the structure of the present invention may be constituted as a brake, as by anchoring either the shaft member 10 or the frame member R against turning movement, the other member remaining free to turn, to thereby allow the structure 9 to brake rotary movement of the turnable member.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In dynamic mechanism embodying a shaft member and a cooperating journal member mounted for relative turning movement, the one with respect to the other, the combination, with said members, of coupling means operable to frictionally interconnect said members, yielding means normally biasing said coupling means toward member disconnected position, actuating means comprising a mounting component secured against axial movement with respect to one of said members, a cooperating thrust component connected with said coupling means and shiftable with respect to said mounting component to move the coupling means against the influence of said yielding means toward member connecting position, means forming an expansible fluid pressure chamber between said components, one of said components having a cavity formed with a bottom wall and an open top, a pressure fluid supply duct connected with said cavity through said bottom wall, a cover forming a top wall closing the open top of said cavity and formed with a vent duct, a resilient gasket disposed in said cavity between said top and bottom walls, said gasket having a central boss on one side in position to engage one of said walls around the duct therein, and a peripheral rib on the other side of said gasket in position to sealingly engage the other of said walls around the duct therein, said gasket having a diaphragm portion extending between said boss and rim and adapted to yield and uncover either one of said ducts while sealingly closing the other.

2. In dynamic mechanism embodying a shaft member and a cooperating journal member mounted for relative turning movement, the one with respect to the other, the combination, with said members, of coupling means operable to frictionally interconnect said members, yielding means normally biasing said coupling means toward member disconnected position, actuating means comprising a mounting component secured against axial movement with respect to one of said members, a cooperating thrust component connected with said coupling means and shiftable with respect to said mounting component to move the coupling means against the influence of said yielding means toward member connecting position, means forming an expansible fluid pressure chamber between said components, one of said components having a cavity formed with a bottom wall and an open top, a pressure fluid supply duct connected with said cavity through said bottom wall, a cover forming a top wall closing the open top of said cavity and formed with a vent duct, a sealing flexible disk gasket having a peripheral rib on one side thereof, in position to sealingly engage one of said walls around the duct therein, and a sealing protrusion on the other side of said gasket, in position to simultaneously sealingly engage the other of said walls around the cavity connected end of the duct therein, said cavity being in open communication with said expansible fluid pressure chamber, and spring means yieldingly urging said gasket to press the peripheral rib thereof into sealing engagement with the facing wall of said cavity.

3. In dynamic mechanism embodying a shaft member and a cooperating journal member mounted for relative turning movement, the one with respect to the other, the combination, with said members, of coupling means operable to frictionally interconnect said members, yielding means normally biasing said coupling means toward member disconnected position, actuating means comprising a mounting component secured against axial movement with respect to one of said members, a cooperating thrust component connected with said coupling means and shiftable with respect to said mounting component to move the coupling means against the influence of said yielding means toward member connecting position, means forming an expansible fluid pressure chamber between said components, one of said components having a cavity formed with a bottom wall and an open top, a pressure fluid supply duct connected with said cavity through said bottom wall, a cover forming a top wall closing the open top of said cavity and formed with a vent duct, and a flexible disk gasket having an embossment portion on one side thereof, in position to sealingly engage one of said walls around the duct therein, and a peripheral rib portion on the opposite side of said disk gasket, in position to sealingly engage the other of said walls around the cavity connected end of the duct therein, said disk gasket having a flexible zone intermediate said embossment and rib portions permitting retraction of either of said portions from sealing engagement with its associated wall.

4. In dynamic mechanism embodying a shaft member and a cooperating journal member mounted for relative turning movement, the one with respect to the other, the combination, with said members, of coupling means operable to frictionally interconnect said members, yielding means normally biasing said coupling means toward member disconnected position, actuating means comprising a mounting component secured against axial movement with respect to one of said members, a cooperating thrust component connected with said coupling means and shiftable with respect to said mounting component to move the coupling means against the influence of said yielding means toward member connecting position, means forming an expansible fluid pressure chamber between said components, one of said components having a cavity formed with a bottom wall and an open top, a pressure fluid supply duct centrally connected with said cavity through said bottom wall, a cover forming a top wall closing the open top of said cavity, said cover being formed with a vent duct in coaxial alinement with the cavity connected end of said supply duct, and a gasket having a central embossment portion on one side thereof, in position to sealingly engage one of said walls around the duct therein, and a sealing protrusion portion on the opposite side of said gasket, in position to sealingly engage the other of said walls around the cavity connected end of the duct therein, said cavity being in open communication with said expansible fluid pressure chamber, and said gasket having a flexible zone intermediate said embossment and protrusion portions to permit either portion to be retracted from sealing position with its associated wall.

5. In dynamic mechanism embodying a shaft member and a cooperating journal member mounted for relative turning movement, the one with respect to the other, the combination, with said members, of coupling means operable to frictionally interconnect said members, yielding means normally biasing said coupling means toward member disconnected position, actuating means comprising a mounting component secured against axial movement with respect to one of said members, a cooperating thrust component connected with said coupling means and shiftable with respect to said mounting component to move the coupling means against the influence of said yielding means toward member connecting position, means forming an expansible fluid pressure chamber between said components, one of said components having a cavity in open communication with said chamber and providing a bottom wall and an open top, a pressure fluid supply duct connected with said cavity through said bottom wall, a cover forming a top wall closing the open top of said cavity, said cover being formed with a vent duct in coaxial alinement with the cavity connected end of said supply duct, a flexible diaphragm forming a disk gasket having a central embossment portion on one side thereof, in position to sealingly engage one of said walls around the duct therein, and a peripheral rib portion on the opposite side of said disk gasket, in position to sealingly engage the other of said walls around the cavity connected end of the duct therein, said cavity being in open communication with said expansible fluid pressure chamber, outwardly of said gasket, the resilience of said diaphragm permitting either of said portions to retract from duct sealing engagement with its associated wall, and spring means yieldingly pressing the peripheral rib thereof into sealing engagement with the facing wall of said cavity.

References Cited in the file of this patent

UNITED STATES PATENTS

| | | |
|---|---|---|
| 2,185,096 | Treer | Dec. 26, 1939 |
| 2,440,589 | Kegresse | Apr. 27, 1948 |
| 2,467,830 | Hornbostel | Apr. 19, 1949 |
| 2,511,520 | Walton | June 13, 1950 |
| 2,512,360 | McLean | June 20, 1950 |
| 2,517,972 | Cardwell et al. | Aug. 8, 1950 |
| 2,567,391 | Mead | Sept. 11, 1951 |
| 2,581,637 | Danly et al. | Jan. 8, 1952 |
| 2,667,248 | Wissman | Jan. 26, 1954 |
| 2,734,401 | Berndtson | Feb. 14, 1956 |
| 2,827,142 | Aschauer | Mar. 18, 1958 |